United States Patent [19]

Nadkarni

[11] E Patent Number: Re. 31,902

[45] Reissued Date of Patent: May 28, 1985

[54] DISPERSION STRENGTHENED METALS

[75] Inventor: Anil V. Nadkarni, Mentor, Ohio

[73] Assignee: SCM Corporation, New York, N.Y.

[21] Appl. No.: 565,342

[22] Filed: Dec. 27, 1983

Related U.S. Patent Documents

Reissue of:

[64] Patent No.: 4,315,770
Issued: Feb. 16, 1982
Appl. No.: 146,140
Filed: May 2, 1980

[51] Int. Cl.[3] ..... B22F 9/00
[52] U.S. Cl. ..... 75/0.5 BC; 75/0.5 C
[58] Field of Search ..... 75/0.5 BC, 0.5 C, 0.5 R

[56] References Cited

U.S. PATENT DOCUMENTS

| | | | |
|---|---|---|---|
| 3,552,954 | 1/1971 | McDonald, Jr. | 75/0.5 BC |
| 3,709,667 | 1/1973 | Selman | 75/206 |
| 3,740,210 | 6/1973 | Bomford et al. | 75/0.5 BC |
| 3,779,714 | 12/1973 | Nadkarni et al. | 75/0.5 BC |
| 3,893,844 | 7/1975 | Nadkarni | 75/0.5 BC |

*Primary Examiner*—W. Stallard
*Attorney, Agent, or Firm*—Robert A. Sturges; Merton H. Douthitt

[57] ABSTRACT

A process for dispersion strengthing of atomized alloy particles by internal oxidation is substantially improved by providing atomized particles substantially free of oxide surface film to enhance the efficiency of the internal oxidation step. The atomized alloy particles can be produced by dry collection to prevent oxide film formation, or alternatively, the oxide surface film can be removed by mechanical action removal or by chemical leaching.

10 Claims, No Drawings

DISPERSION STRENGTHENED METALS

Matter enclosed in heavy brackets [ ] appears in the original patent but forms no part of this reissue specification; matter printed in italics indicates the additions made by reissue.

BACKGROUND OF THE INVENTION

This invention pertains to an improved process for producing improved dispersion strengthened alloy metal products.

Dispersion strengthened metal products, such as copper dispersion strengthened with aluminum oxide, have many commercial and industrial uses. Welding electrodes, for example, require good electrical and thermal conductivities together with good strength and hardness at elevated temperatures. Dispersion strengthening has been recognized in the past as a method for increasing strength and hardness of metals. A solid solution alloy comprising a relatively noble matrix metal having relatively low heat or free energy of oxide formation and a solute metal having relatively high negative heat or free energy of oxide formation can be dispersion strengthened by heating the alloy under oxidizing conditions to preferentially oxidize the solute metal. This technique of oxidizing the solute metal to a solute metal oxide is known in the art as in situ internal oxidation or more simply internal oxidation.

Several processes for internal oxidation have been suggested. Commonly assigned U.S. Pat. No. 3,779,714, incorporated herein by reference, provides an improved alloy-oxidant mixture wherein the oxidant includes an oxide which releases oxygen to oxidize the solute metal of the alloy. A further improvement is set forth in commonly assigned U.S. Pat. No. 3,893,844 which provides improved dispersion strengthened metals by first recrystallizing the alloy powder prior to internal oxidation to increase the grain size of the alloy to a grain size at least as large as Grain Size No. 6 as measured by ASTM Test. No. E-112.

In commonly assigned U.S. Pat. No. 3,779,714, a dilute solid solution alloy powder is obtained by atomizing an alloy melt of matrix metal with a minor amount of solute metal wherein the melt is atomized by nitrogen and collected as powder in water. During the atomization process, however, oxygen in the atomization chamber tends to oxidize the solute metal on the surface of the alloy particles. For instance, a copper-aluminum alloy tends to become oxidized during atomization to form an aluminum oxide film on the particle surfaces. Further oxidation of the surface aluminum can occur upon the powder contacting water in the collection tank. The hot powder falling into the water generates steam in the atomization chamber which further contributes to the surface oxidation of the alloy particles. The accumulative effect of surface oxidation is the formation of a relatively thick aluminum oxide film on the surface of the alloy particles.

It now has been found that the surface oxide film formed on the alloy particles remains intact and can be detrimental in subsequent internal oxidation by forming a barrier to internal oxidation. Subsequent processing can inhibit interparticle bonding during subsequent fabrication of the powder into compacted fully dense parts obtained, for example, by hot forging and rolling. The final product can be weak and brittle. In a subsequent hot extrusion step, the powder particles tend to stretch out into elongated fibers thus improving interparticle bonding, although surface oxide film has been found to remain on fiber interfaces and causes diminished mechanical properties due to improper and incomplete interparticle or interfiber bonding. Elimination of the surface oxide has been found to substantially improve the mechanical properties of the dispersion strengthened alloy such as stress rupture strength as well as substantially improve the internal oxidation step for dispersion strengthening alloys. The surface oxide forms a barrier to the diffusion of oxygen into the alloy particles and, therefore, elimination of the surface oxide provides efficient, uniform, and effective oxidation of higher solute metal alloys. Significant improvements in the properties of internally oxidized alloys can be achieved by atomizing alloys in helium and collecting the alloy powder dry. These and other advantages will become more apparent by referring to the Detailed Description of the Invention.

SUMMARY OF THE INVENTION

The process for dispersion strengthening of alloy metal can be substantially improved by the elimination of the surface oxide build-up on the alloy metal particles by preventing the oxide surface formation or by removing the oxide build-up prior to the step of internal oxidation. The improved process comprises atomization of alloy metal and eliminating the surface oxide by preventing oxide build-up or by removing the oxide prior to the step of internal oxidation and forming consolidated dispersion strengthened metals.

DETAILED DESCRIPTION OF THE INVENTION

In practicing this invention, the powdered alloy comprising a relatively noble matrix metal and a solute metal is produced by conventional techniques such as melting the metal under inert or reducing conditions and thereafter comminuting the alloy by atomization to form a particulate alloy having an average particle size of less than about 300 microns. Water atomization of molten metal alloys is shown in U.S. Pat. No. 2,956,304 wherein metal particles are produced at particularly small particle sizes less than about 100 mesh. Water atomization similarly causes considerable surface oxidation of alloy particles due to the high temperatures of molten metal as well as the oxidizing characteristics of the water itself.

The noble matrix metal in the alloy can be defined broadly as those metals having a melting point of at least about 200° C. and whose oxides have a negative free energy of formation at 25° C. of from 0 to 70 kilocalories per gram atom of oxygen. Suitable alloy matrix metals include, for example, iron, cobalt, nickel, copper, cadmium, thallium, germanium, tin, lead, antimony, bismuth, molybdenum, tungsten, rhenium, indium, palladium, osmium, platinum, and rhodium as more particularly set forth in U.S. Pat. No. 3,779,714.

In any particular combination of matrix metal and solute metal in the alloy to be dispersion strengthened by internal oxidation, the matrix metal must be relatively noble with respect to the solute metal so that the solute metal will be preferentially oxidized. This is achieved by selecting the solute metal such that its negative free energy of oxide formation at 25° C. is at least 60 kilocalories per gram atom of oxygen greater than the negative free energy of formation of the oxide of the matrix metal at 25° C. Such solute metals have a negative free energy of oxide formation per gram atom of oxygen of over 80 kilocalories and generally over 120 kilocalories. Suitable alloy solute metals include: silicon, titanium, zirconium, aluminum, beryllium, thorium, chromium, magnesium, manganese, niobium, tantalum, and vanadium (VO), as more particularly set forth in U.S. Pat. No. 3,779,714. In accordance with the process of this invention, atomized alloy particles substantially free of oxide surface film are internally oxidized to form dispersion-strengthened metal.

In accordance with one aspect of this invention, atomized alloy particles are processed to remove the oxide build-up on the particle surface formed during atomization. The surface oxide film can be mechanically removed such as by milling, grinding or roll flaking the atomized alloy particles. Ballmilling, for example, can be used at a 4:1 to 8:1 ratio of ball/metal for 2 to 8 hours. Roll flaking can be used to reduce thickness of the atomized particles as well as remove oxide films which are believed to break up and/or redistribute the surface oxide over a larger surface area generated by the flaking of spherical powder. Flakes have larger surface:volume ratio than spheres of same volume. These and similar processes which deform or flatten the powder particle would be suitable.

In accordance with a further aspect of this invention, the surface oxide film can be removed by chemical action such as leaching. For example, atomized copper alloy powder can be leached in dilute nitric acid, ammonium hydroxide and also in mixtures of ammonium and sodium hydroxides.

Still, a further method of preventing surface oxide build-up on the atomized alloy particles pertains to collecting the alloy powder in a dry medium and avoid wet collection mediums such as water. Dry collection within helium, for instance, prevents contact with an oxidizing substance as well as avoids steam formation within the atomization chamber. Helium is substantially better than nitrogen in that the thermal conductivity thereof is 6.5 times that of nitrogen whereby much faster quenching, without appreciable oxidation, can be achieved. Helium quenching enables faster quenching of the atomized particles, thus minimizing oxidation of the solute metal such as aluminum at the particle surface and further minimizes migration of solute metal from the center of the alloy particle to the particle surface which can detrimentally deplete the alloy particle of solute metal.

The alloy particles being substantially free of surface oxide build-up can be internally oxidized by a variety of methods such as disclosed in U.S. Pat. Nos. 3,488,185; 3,552,954; and 3,179,515. A particularly preferred method is shown in commonly assigned U.S. Pat. No. 3,779,714 wherein 100 weight parts of alloy particles are mixed with about 0.1 to 10 weight parts of oxidant. The exact proportion of oxidant mixture depends on the solute metal to be oxidized and the concentration of solute metal in the alloy.

The preferred oxidant comprises an intimate mixture of heat-reducible metal oxide having a negative free energy of formation at 25° C. of up to about 70 kilocalories per gram atom of oxygen, and finely divided hard, refractory metal oxide having a negative free energy of formation exceeding the negative free energy of formation of the heat-reducible metal oxide by at least about 60 kilocalories per gram atom of oxygen at 25° C. The heat-reducible metal oxide is present in the oxidant in an amount sufficient for complete oxidation of the solute metal in the alloy. The hard, refractory oxide in the oxidant is present in substantially the same equivalent elemental proportion as the solute metal in the alloy, and both are of a particle size suitable for dispersion strengthening of the oxidant residue resulting from the internal oxidation, as set forth in U.S. Pat. No. 3,779,714. After internal oxidation, the oxidant residue comprises particles of in situ residue of heat-reducible metal oxide and particles of hard, refractory metal oxide uniformly distributed therein and the residue of heat-reducible metal oxide is intimately dispersed within the alloy powder. The dispersion-strengthened metal mixture is eventually coalesced and consolidated by hot-working to form a solid metal workpiece whereby the residue of heat-reducible metal is dispersion strengthened by the hard, refractory metal oxide and forms an integral part of the dispersion strengthened resulting workpiece. Dispersion strengthened metal powders are ordinarily consolidated under heat and pressure such as by extrusion at temperatures usually above about 1400° F. wherein the extrudate emerges from the extrusion press typically in cylindrical bar stock which then can be cold drawn and machined to the desired configuration of the workpiece.

The advantages of this invention wherein surface oxide build-up is either prevented or removed from alloy particles prior to the step of internally oxidizing are further illustrated in the following examples.

EXAMPLE 1

A copper alloy containing 0.2% by weight alloyed aluminum was atomized by helium and collected dry. The powder was then heat treated in accordance with the process of U.S. Pat. No. 3,779,714 and finally hot extruded into ¼" dia rods. Table 1 shows the room temperature mechanical properties of this material compared with the conventional alloy made by nitrogen atomization and water collection.

TABLE 1

Room Temperature Properties of Internally Oxidized Cu-0.20% Al alloy. ($N_2$/wet vs. He/dry)

| Atomization | Hardness | Tensile Strength | Elongation | Electrical Conductivity |
|---|---|---|---|---|
| (gas/collection) | ($R_B$) | (psi) | (%) | (% IACS) |
| $N_2$/water | 58 | 58,000 | 24 | 91 |
| He/dry | 68 | 68,000 | 22 | 92 |

There is a significant improvement in room temperature tensile strength and hardness on helium atomized and dry collected material. The improvement is even more dramatic at high temperatures. This is demonstrated by the data in Table 2.

TABLE 2

1550° F. Stress Rupture Properties of Internally Oxidized Cu-0.20% Al alloy. ($N_2$/wet vs. He/dry)

| Atomization | 100 Hour Rupture Strength at 1550° F. |
|---|---|
| (gas/collection) | (psi) |
| $N_2$/water | 3,800 |
| He/dry | 8,000 |

The 100 hour rupture strength at 1550° F. was more than doubled when the alloy powder was atomized by helium and collected dry. This also comprises a significant improvement over the best values reported in literature for similar composition in as extruded condition.

Preston and Grant[1] report a 100 rupture stength value of 6,000 psi for internally oxidized Cu-0.23% Al alloy. The room temperature properties reported by them are similar to those of He/dry material.

1. Preston, O. and Grant, N.J.; Dispersion Strengthening of Copper by Internal Oxidation; Transactions AIME, Vol. 221, Feb. 1961, pp. 164–172.

I claim:

1. In a process for dispersion-strengthening atomized alloy particles having an average particle size less than about 300 microns by internally oxidizing said alloy particles, the improvement comprising:

providing atomized *copper/aluminum* alloy particles being substantially free of oxide surface film whereby said alloy is internally oxidized without obstruction of the oxide surface film.

2. The process of claim 1 wherein the atomized particles are dry collected within an inert gas or liquid to prevent oxide surface film formation on the atomized particles.

3. The process in claim 2 wherein the atomized particles are dry collected within helium gas.

4. The process of claim 1 wherein the atomized alloy particles are subjected to mechanical working to mechanically remove the oxide surface film.

5. The process in claim 4 wherein the mechanical working is ball milling.

6. The process in claim 4 wherein the mechanical working is grinding.

7. The process in claim 4 wherein the mechanical working is flaking.

8. The process in claim 1 wherein the oxide surface film is removed by chemical leaching.

9. The process in claim 8 wherein the chemical leaching agent is nitric acid.

10. The process in claim 8 wherein the chemical leaching agent is ammonium hydroxide.

* * * * *